United States Patent [19]
Jarrett

[11] 3,968,399
[45] July 6, 1976

[54] METHOD FOR DRIVING A LED AT HIGH SPEED

[75] Inventor: Bobby R. Jarrett, Fredericksburg, Va.

[73] Assignee: The United States of America as represented by the Secretary of the Navy, Washington, D.C.

[22] Filed: Mar. 19, 1975

[21] Appl. No.: 559,944

[52] U.S. Cl. ............................ 315/200 R; 307/311; 315/207; 331/94.5 H
[51] Int. Cl.² ........................................ H05B 37/00
[58] Field of Search .............. 307/311; 331/94.5 H, 331/94.5 PE; 357/18; 315/200, 207

[56] References Cited
UNITED STATES PATENTS

3,784,844  1/1974  McGrogan, Jr. ................. 307/311 X

OTHER PUBLICATIONS

*MECL Integrated Circuits Data Book*, Third Ed., Motorola Inc., pp. 3–170, 171, Sept. 1973.

*MECL System Design Handbook*, 2nd Ed., pp. VIII, IX, Dec. 1972, Motorola Inc.

*Primary Examiner*—R. V. Rolinec
*Assistant Examiner*—Lawrence J. Dahl

[57]  ABSTRACT

Methods of driving a light-emitting diode (LED) or an injection diode at very high digital data rates using high speed emitter coupled logic (ECL) gates.

9 Claims, 6 Drawing Figures

METHOD FOR DRIVING A LED AT HIGH SPEED

BACKGROUND OF THE INVENTION

The development of low-loss multimode optical fibers has resulted in interest in the light emitting-diode (LED) as a telecommunications optical source. Fiber-optic cables are being used in applications requiring freedom from electromagnetic interference, low weight, and the ability to tolerate high temperature environments. The attractiveness of the optical transmission of digital data is a function of the bandwidth obtained.

The frequency limitation in driving an LED is theoretically set by the carrier lifetime, $\tau_c$, but is practically established by the ability to supply charging current to the LED's capacitance. With presently available diodes, carrier lifetime ($f=1/(2\tau_c)$), theoretically allows operation at more than 200Mhz. The data rates for practical circuits, however, have only been about 100Mhz.

Frequency response, however, is dependent on capacitance, which is a function of area, which determines current handling capability. With the selection of a high capacitance LED, any driver would suffer a speed reduction over the low capacitance case. To obtain high speed, the capacitance of the device must be minimized. This is the distinguishing feature of high speed LED's. The capacitance of high frequency LEDs may vary, typically from the 100 pF to the 1000 pF range during the switching time. Currents up to 200 mA are required to charge this capacitance at 100Mhz (1000 pF is about 1.6ohms reactive at 100Mhz).

LEDS can be modulated directly by step-recovery diodes, Gunn-effect diodes or Trapatt diodes at frequencies of 100Mhz and higher. But a forward-biased LED has a non-linear low impedance. One way to achieve maximum speed is to drive the LEDS directly from a low-impedance source (approximately equal to $r_d$). However, such a brute force method is not ideal for solid state circuits since the efficiency is low.

To prevent the LED rise time from limiting the system bandwidth, the following rule of thumb should be applied: $t_r(LED) \leq 0.35/(2.2BWreceiver)$. Usually the bandwidth restriction should be assigned to the photoreceiver to maximize signal to noise and sensitivity.

A large number of circuits have evolved for the purpose of driving LED's. Typical high frequency applications require that currents in the 25–200 mA range be put through the diode. A representative circuit for driving an LED is the emitter-coupled video stage. Its basic function, however, as a fast current switch is well recognized and is exploited in the emitter-coupled-logic (ECL) family. In using the discrete version of this circuit, the designer would select a relatively costly device to obtain high speed in the 50–200 mA range, or would parallel two or more devices to obtain a composite $Q_2$ stage where the current load would be shared. The base of $Q_2$ would normally be biased to match the video stage to the logic type used to develop the signal.

OBJECT OF INVENTION

An object of this invention is to use the uncommitted outputs of standard emitter-coupled-logic (ECL) devices to economically drive an LED at high speed and appreciable currents.

An object of this invention is to use the uncommitted outputs of standard emitter-coupled-logic (ECL) devices to economically drive an injection diode.

Other objects, advantages and novel features of the invention will become apparent from the following detailed description of the invention when considered in conjunction with the accompanying drawings.

DETAILED DESCRIPTION OF THE INVENTION

Figure 1:
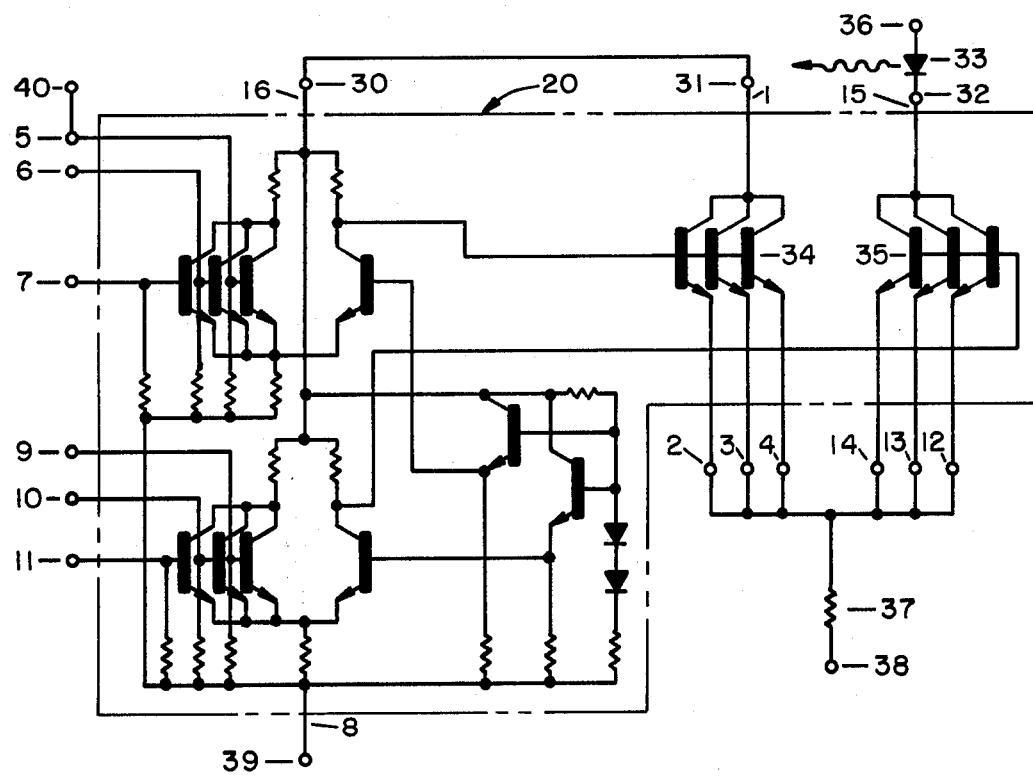
FIG. 1: The MC 10210 OR gate connected as a current switch to drive a LED

A LED can be driven at currents approaching 100 mA and at frequencies up to 100Mhz utilizing available members of the ECL family. Perhaps the most convenient commercially available ECL device for this purpose is the MC 10210 (designated reference numeral 20) high speed dual three input-three output OR gate. This gate has a typical propagation delay of 1.5ns.

Most ECL circuits have two $V_{cc}$ leads, $V_{cc1}$ and $V_{cc2}$. $V_{cc}$ is a general term for the most positive power supply voltage to a MECL device, usually ground. $V_{cc1}$ (pins 1 and 15) is the power supply voltage for the output devices. $V_{cc2}$ (pin 16) is the power supply voltage for the current switches and bias circuit. The separate $V_{cc}$ pins reduce cross-coupling and $V_{bb}$ spiking when the ICs drive heavy loads, where $V_{bb}$ is the midpoint of the ECL logic swing, midway between the upper logic level and the lower logic level. The $V_{cc1}$ pins 1 and 15, supply current to the output drivers, while $V_{cc2}$ pin 16 is connected to the circuit's logic transistors. The MC 10210 device, 20, is used here for driving an LED, a purpose entirely different from the Boolean OR operation. It can only be used for this purpose through an unconventional connection of the outputs. The MC 10210 designed for clock driving, has three emitter follower outputs pins 2, 3, 4, and 14, 13 and 12 for each of its two OR gates. Each output group of three drivers has its own $V_{cc1}$ pin 1 to 15. Thus, there is free access to the collectors of the output transistors for connection of the LED 33 in a current-switch configuration. By wire-ORing the output emitters, pins 2, 3, 4, 12, 13 and 14, full current drive capability of the multiple OR-gate output structure is obtained.

Figure 2:
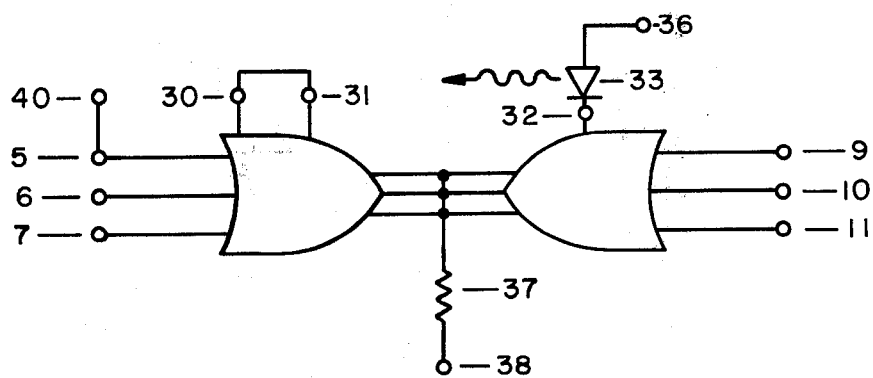
FIG. 2: A logic diagram of FIG. 1.

FIG. 1 and FIG. 2 show one LED driver configuration in which the normal logic function is preserved. The input source 40 is wired to pin 5. $V_{Bias}$ 36 is the LED 33 bias voltage, that is the cathode of the LED 33 is connected to the $V_{cc}$ pin 5 of the gate while the anode of the LED is connected to $V_{Bias}$ 36. $R_E$ 37, which is a current setting resistor, is connected to pins 2, 3, 4, 12, 13 and 14. The value of $R_E$ 37 is selected to provide the desired current for the emitter coupled pair and, in turn, the LED current. $V_{EE}$ 39, the most negative power supply voltage, usually −5.2 volts, is at pin 8. $V_{TT}$ 38 a termination resistor voltage supply for the outputs is nominally −2.0 volts when $V_{EE}$ is −5.2 volts.

$V_{TT}$ 38 or $V_{EE}$ 39 is connected to output terminals through $R_E$ 37. The $V_{CC}-V_{EE}$ voltage differential is generally limited to less than 8 volts. $V_{CC}$ is the higher bias value and is generally 0 volts (ground). This allows the gate inputs 9, 10, 11 on the LED driving half of the IC to be left open (logic ZERO), while the logic signal can be applied to the other gate. Thus the output transistors function as a composite emitter follower $Q_1$ 34, which drives a composite base amplifier $Q_2$ 35.

Electrically, the signal that appears at the gate outputs 2, 3, 4, 12, 13, 14 is very similar to what would appear if the LED were not inserted in the collector circuit. That is, when any of the inputs 5, 6, 7 are high (logic ONE), while inputs 9, 10, 11 are low (logic ZERO), the output 2, 3, or 4 is high (logic ONE).

However, these outputs are not now the primary outputs. The concern here is with the photon output of the light emitting diode. In FIG. 1, when the input is high, the output gate is high, but the light intensity of the LED is low. Correspondingly, when the input is low, the photon output of the LED is high. That is, a conversion from electrical representation to light representation has been made.

The circuit can also be driven differentially by complementary operation of the two gates. The circuit of FIG. 1 would be expected to have slightly better frequency performance than the differential drive circuit.

However, $Q_1$ 34 will never be turned off and only about half the current swing, $V_{OL}-V_{EE}/2R_E$ vs. $V_{OH}-V_{EE}/R_E$ of the differential drive is available. $V_{OL}$ is the output logic LOW voltage level, that is, the voltage level at the output terminal for a specified output current, with the specified conditions applied to establish a LOW level at the output. Similarly $V_{OH}$ is the output logic HIGH voltage level. Maximum speed can be obtained when the LED supply, $V_{Bias}$, is higher than $V_{CC2}$. But reasonable results are obtained if the $V_{CC}$ supply is increased to above 6 volts and used for both $V_{CC1}$, $V_{CC2}$ and the LED $V_{Bias}$.

For the nominal 5.2 volts $V_{CC}$ -$V_{EE}$ differential, the $Q_2$ 35 emitter voltage will be about $-1.7$ volts. With a 1.3 volts drop across the LED 33, the base-collector junction becomes forward-biased by 0.3 to 0.4 volts, and the transistor approaches saturation.

Figure 3:
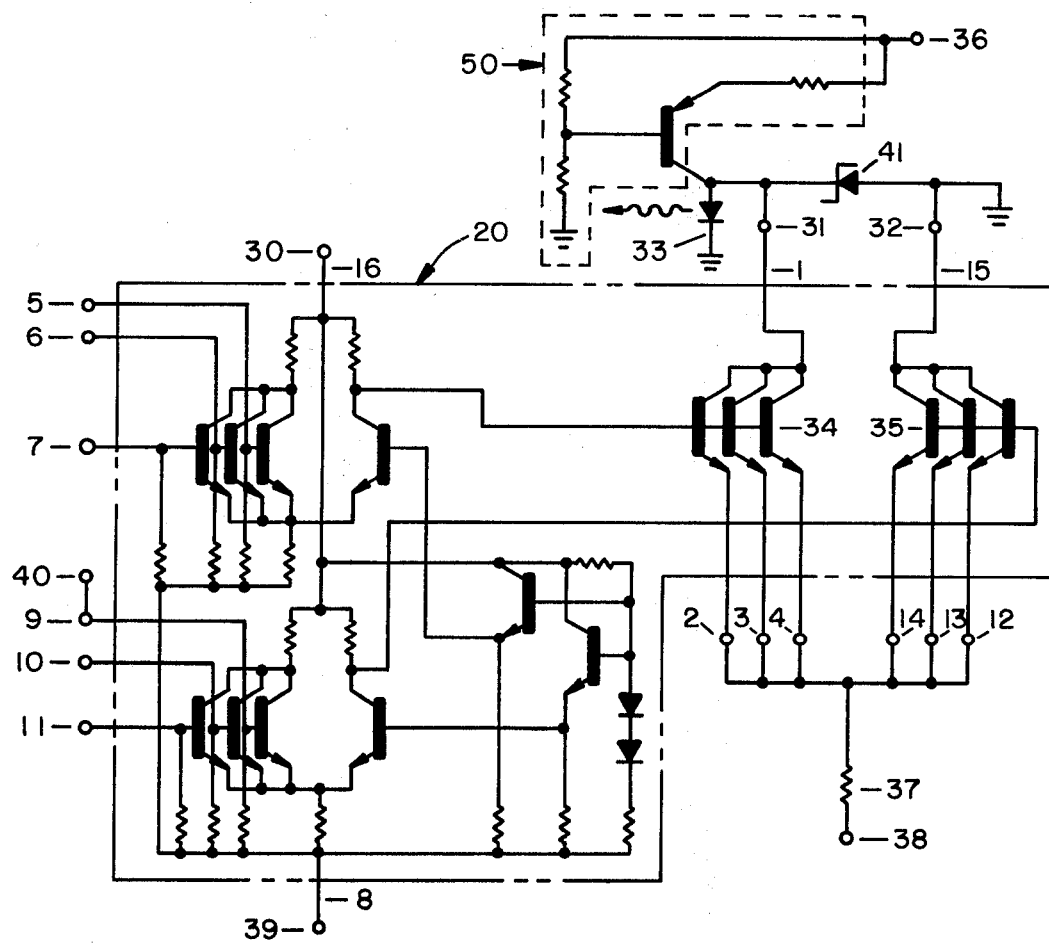
FIG. 3: A Schottky diode and current source let the MC 10210 gate operate as current shunt.

An alternate approach to the logic-gate drive method is to shunt a constant current source on or off the LED 33, depending on the gate logic input. The circuit of FIG. 3 uses a Schottky 41 or other fist diode to pull the LED's 33 anode potential below ground when the compositie $Q_2$ 35 emitter is at $V_{OL}$ (logic ZERO) thereby back biasing the LED and shunting the constant current source 50 through $Q_1$ 34. The current demand through $Q_1$ 34, established by $R_E$ 37, should be slightly higher than the constant current source value. This will guarantee that the Schottky diode 41 has some drive. Then when the logic input changes, $Q_1$ 34 will be cut off and the constant current source 50 will be shunted through the LED 33. The available LED current is just slightly less than $(V_{OL} - V_{EE})/2R_E$.

This circuit can also be driven differentially. Fastest circuit operation, as before, is obtained for common-emitter/common-base operation. True constant-current performance results from the differential drive, and the current through $R_E$ 37 is halved. The LED current doesn't change appreciably, but the output power dissipation gets cut in half because either $Q_1$ 34 or $Q_2$ 35 is always off.

To get higher current drive, all six output transistors can be connected to form one composite device. The circuit can then drive a 100 to 150 mA load. At only a small sacrifice in speed, two of the 10210 ICs can be connected in tandem to form the differential drive circuits of FIG. 1 and FIG. 3.

Figure 4:
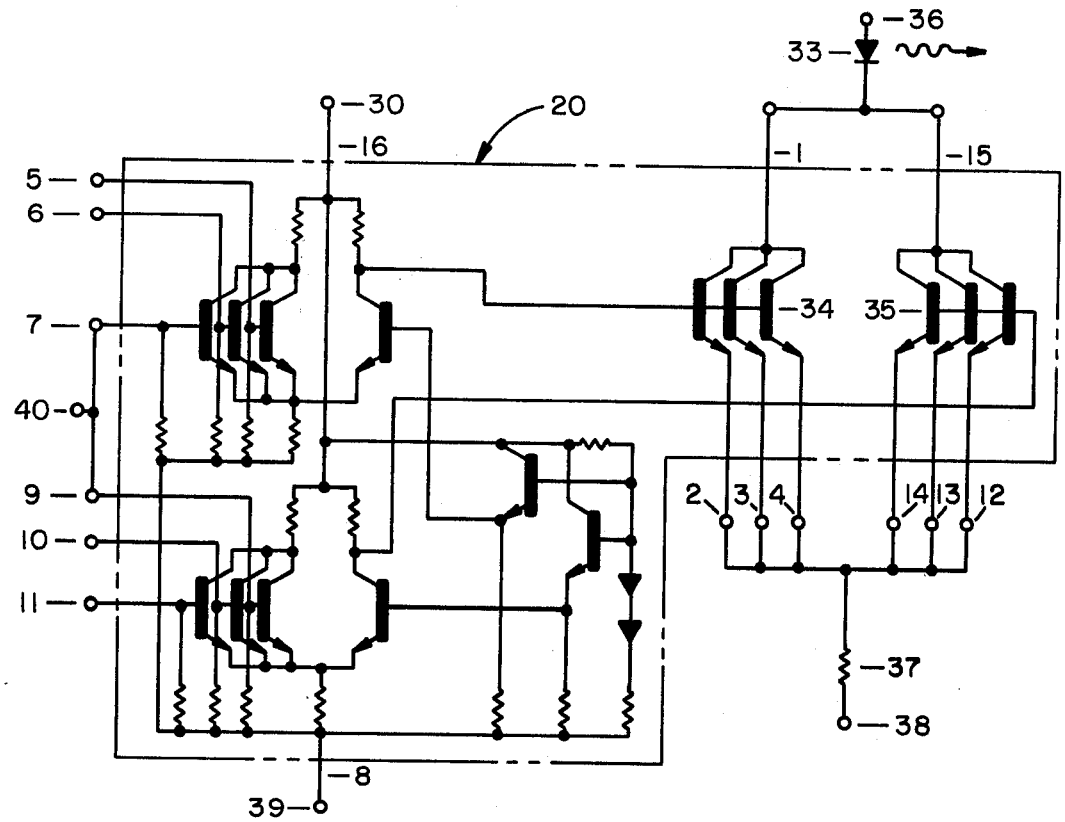
FIG. 4: Tandem hookup of MC 10210 OR gate doubles drive current to LED.

The MC 10210 can also be connected as one composite device and used single-ended for applications where high speed isn't critical but high current drive is (FIG. 4). The standard termination potential, $V_{TT}$ 38, of $-2$ volts proves useful, since it allows a large current swing in the LED 33.

Figure 5:
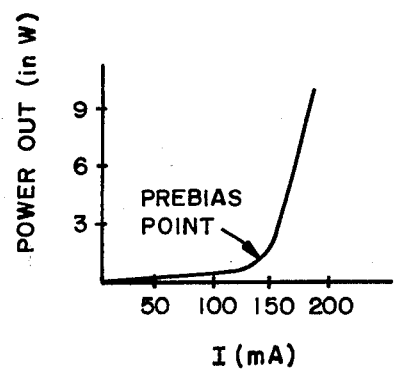
FIG. 5: Power output characteristics of a double heterostructure injection laser diode.

The emitter-coupled, current switch configurations can also drive double-heterostructure, AlGaAs diode injection lasers 45. Such laser diodes 45 have a power output that typically has a threshold level, but they can reach bit rate of 1 GHz. See FIG. 5. The diode 45 should be prebiased to just below threshold to avoid the time delay associated with population inversion buildup when the current is switched on.

Figure 6:
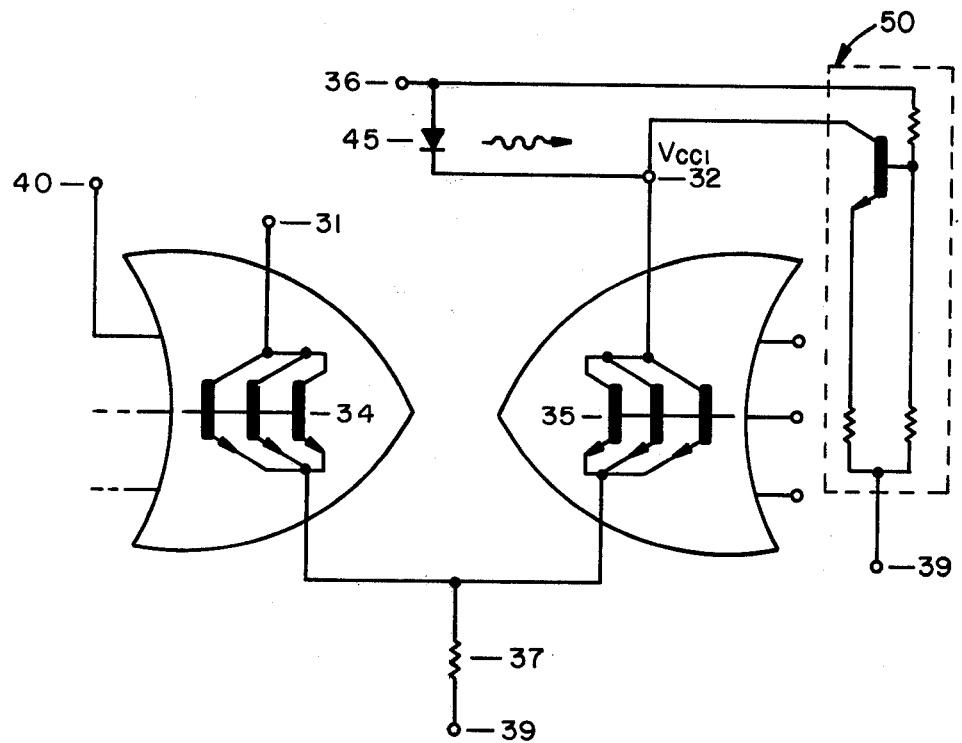
FIG. 6: MC 10210 OR gate with the addition of a discrete component current source connected as current switch to drive an injection laser diode.

The circuit of FIG. 1 can be used with the addition of a discrete component constant current source 50 as shown in FIG. 6. The current through the laser diode 45 is approximately $(V_{OL}-V_{EE})/2R_E$ when the input signal is high and increases to $(V_{OL}-V_{EE})/R_E$ when the input goes low. The idling current is established by the current source but can also be produced by an inductively coupled bleed.

The MC 10210 is rated at 40 mA maximum for each output driver and should be capable of an output approaching 120 mA total for all six drivers. If even more power is needed the tandem connection or a discrete component emitter-coupled current switch can be used. The MC 10123 (a triple 4-3-3input bus driver) can supply a full 40 mA per output emitter-follower and might be more useful in some applications. The MC 10128 bus driver can provide still more current than the 10123.

What is claimed is:

1. A circuit for driving a diode photon emitting device at frequencies up to 200 MHz comprising:
    at least two high speed emitter-coupled-logic gates, wherein each gate has a plurality of inputs connected to at least one output transistor through a plurality of logic transistors, and wherein the emitter outputs of said output transistors of said logic gates are all wired together to provide full current drive capability of the multiple gate structure, and wherein at least one input of one gate receives the input data signal;
    a current setting resistor connected to the wire-ORed emitters of said output transistors of said logic gates;
    a diode photon emitting device connected at its cathode to the collector of the output transistor of at least one gate in a current-switch configuration;
    means for applying a bias voltage to the anode of said diode photon emitting device; and
    means for applying operating voltages to said logic gates whereby application of a high speed signal to an input of at least one of said logic gates, will drive said diode photon emitting device at high speed.

2. The device of claim 1 wherein:
    said diode photon emitting device is a light emitting diode.

3. The device of claim 1 wherein:
    said diode photon emitting device is a laser injection diode.

4. The device of claim 2 wherein:

the collectors of the logic transistors and the collector of the output transistor of the gate to which the input is being applied are electrically interconnected; and the cathode of said LED is electrically interconnected to the collector of the output transistor of the gate to which the input signal is not being applied.

5. The device of claim 2 wherein there is provided:

circuitry interconnecting the collectors of the logic transistors and the collector of the output transistor functioning as an emitter follower; and circuitry interconnecting said LED at its cathode to the collector of the output transistor functioning as a common base stage.

6. The device of claim 2 wherein:

a Schottky diode connected at its anode to ground and to the colloector of the output transistor of the gate being operated on by the input signal;

the anode of said LED is electrically connected to the cathode of said Schottky diode and to the collector of the output transistor of the gate not being operated on by the input signal;

circuitry interconnecting said LED at its cathode to ground; and a constant current source connected at one end to said anode of the LED and at the other end to said bias voltage means such that said constant current source is shunted on or off said LED, depending on the data input signal.

7. The device of claim 2 wherein there is provided:

a Schottky diode connected at its anode to ground and to the collector of the output transistor functioning as an emitter follower;

circuitry interconnecting said LED at its anode to the cathode of said Schottky diode and to the collector of the output transistor functioning as a common base stage;

circuitry interconnecting said LED at its cathode to ground; and a constant current source connected at one end to said anode of the LED and at the other end to said bias voltage means such that said constant current source is shunted on or off said LED, depending on the data input signal.

8. The device of claim 3 wherein:

the cathode of said laser diode is electrically connected to the collector of the output transistor of the gate to which the input signal is not being applied; and a constant current source is connected at one end to the cathode of said laser diode and at the other end to the anode of said laser diode such that said diode is prebiased to just below its threshold level.

9. The device of claim 2 wherein:

at least one input terminal of one logic gate is wire-ORed to at least one input terminal of another gate and said input signal is applied thereto; and the collectors of the output transistors of the gates to which the signalis applied, are connected to the cathode of said LED.

* * * * *